Feb. 2, 1954  N. C. PRICE  2,667,741
FUEL INJECTION AND BURNER SYSTEM FOR
REACTIVE PROPULSION POWER PLANTS
Original Filed Aug. 23, 1946  2 Sheets-Sheet 1
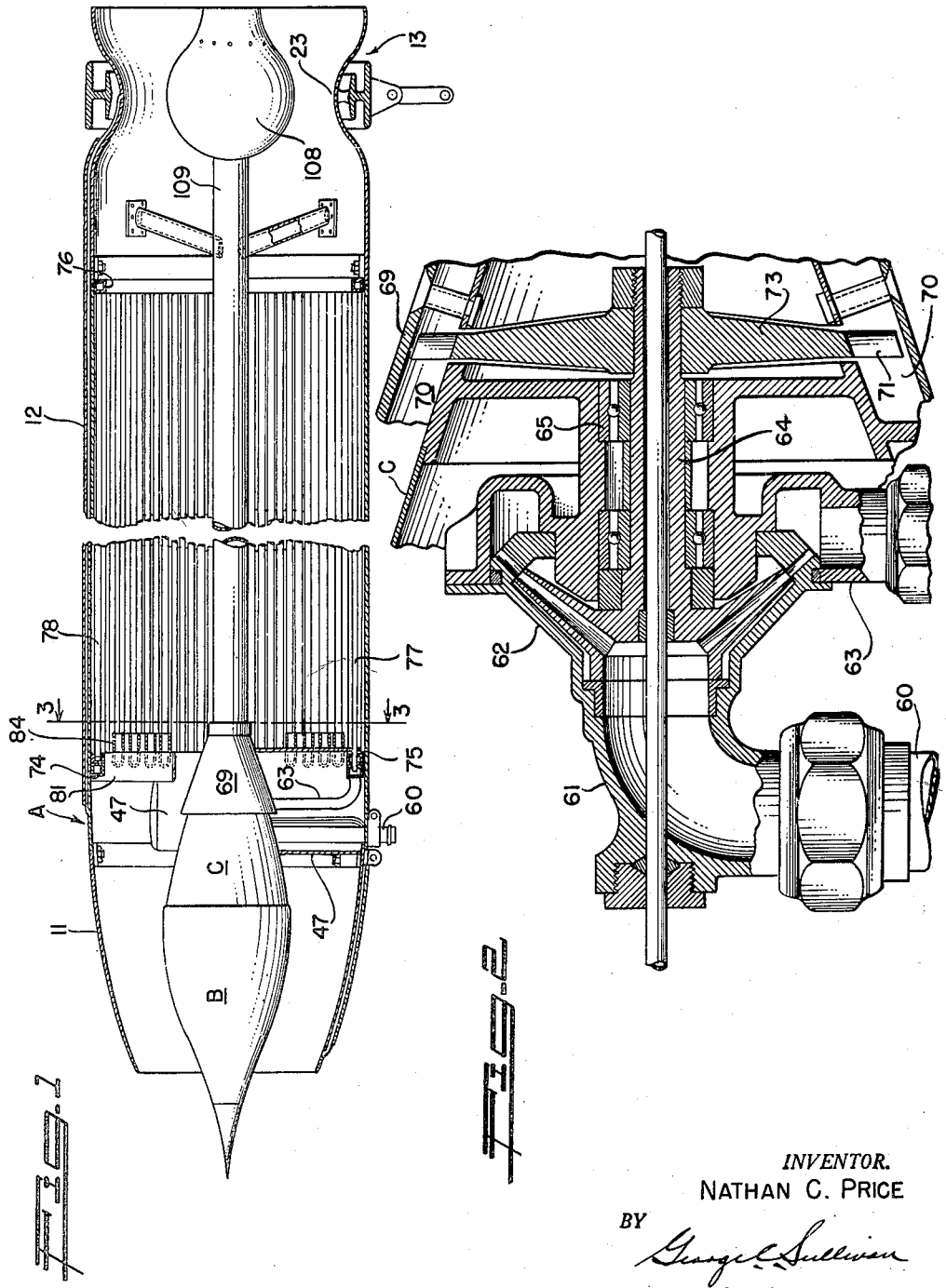
INVENTOR.
NATHAN C. PRICE
BY
George C. Sullivan
Agent

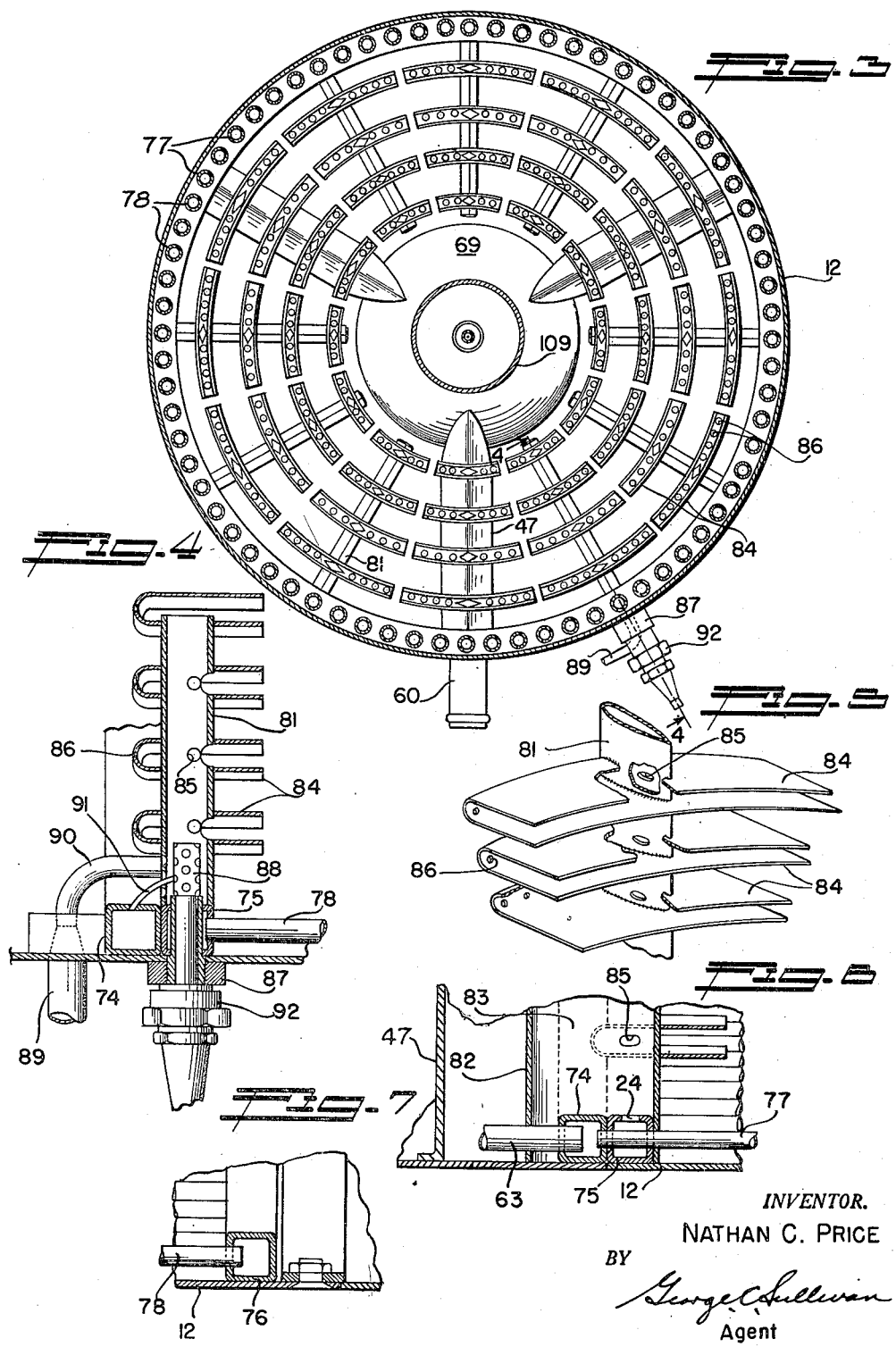

Patented Feb. 2, 1954

2,667,741

UNITED STATES PATENT OFFICE 2,667,741

FUEL INJECTION AND BURNER SYSTEM FOR REACTIVE PROPULSION POWER PLANTS

Nathan C. Price, Los Angeles, Calif., assignor to Lockheed Aircraft Corporation, Burbank, Calif.

Original application August 23, 1946, Serial No. 692,423, now Patent No. 2,540,594, dated February 6, 1951. Divided and this application November 1, 1947, Serial No. 783,536

7 Claims. (Cl. 60—35.6)

This invention relates to reactive propulsion engines, such as ram jet power plants, and relates more particularly to fuel injection devices for burners for this general class of engines. It is a general object of the invention to provide a practical, effective burner means of this type capable of maintaining an efficient combustion of the fuel.

This application is a division of my co-pending application, Serial No. 692,423, filed August 23, 1946, now Patent No. 2,540,594, dated February 6, 1951.

In power plants of the above mentioned type the fuel is injected into a combustion chamber to burn in the high pressure relatively high velocity air stream which flows through the chamber. In order to obtain efficient power plant operation it is necessary to inject the fuel in a manner to effect its substantially complete combustion and to preserve a distributed and yet somewhat confined flame throughout the various speeds of the power plant.

It is another object of the present invention to provide a fuel injection system of the class referred to which effects thorough thermal vaporization of the fuel and then introduces the fuel vapor into the combustion chamber at a multiplicity of shielded injection orifices designed and arranged to effect a uniform dispersion of the vaporized fuel across the air stream flowing through the combustion chamber. The vaporizing and injecting means are constructed and arranged to preserve maintained flame propagation and efficient fuel combustion at the various speeds of operation of the power plant.

It is another object of the invention to provide a fuel burner for use in power plants of the class mentioned, comprising a multiplicity of fuel vapor injectors constructed and arranged to inject the fuel vapor in spaced concentric annular series occupying one or more transverse planes of the combustion chamber to obtain adequate distribution of the resultant flame and to effect substantially complete combustion of the thoroughly vaporized and well-distributed fuel.

A further object of the invention is to provide a fuel vapor burner system of the type referred to in which the individual vapor injectors are related to produce annular flames and yet are supported for free, independent thermal expansion and contraction.

A still further object of the invention is to provide a fuel vapor burner system of the character described embodying a simple, effective means for starting or initiating the burning of the fuel vapor at the several annular rows of injectors. A single electrical igniter is arranged to cause a flame to be propagated with travels to the several injectors of each annular row to initiate fuel vapor burning at all of the injectors.

Other objects and features of the invention will become apparent from the following detailed description of a typical preferred embodiment throughout which description reference is made to the accompanying drawings wherein:

Figure 1 is a longitudinal section of a ram jet power plant embodying the invention, showing certain parts in side elevation;

Figure 2 is an enlarged fragmentary sectional view of the fuel pump and turbine for driving the same;

Figure 3 is an enlarged transverse detailed sectional view taken as indicated by line 3—3 on Figure 1 illustrating the burner means;

Figure 4 is an enlarged fragmentary sectional view taken substantially as indicated by line 4—4 on Figure 3;

Figure 5 is a fragmentary perspective view of the fuel vapor injecting means;

Figure 6 is an enlarged fragmentary sectional view of a portion of the fuel vaporizing means; and Figure 7 is an enlarged fragmentary sectional view of another portion of the vaporizing means.

In the drawings I have shown the fuel vaporizing and injecting system of the present invention incorporated in a ram jet power plant of the class disclosed in my co-pending application identified above. The power plant includes a tubular body or shell A provided at its forward end with an inlet ram 11 of the supersonic type and provided at its rear end with a propulsive nozzle 13. The air compressing action of the inlet 11 is controlled by the movable needle B in the inlet passage. The rear portion of the needle B telescopes over a stationary island C supported in the inlet portion of the shell A by streamlined struts 47. The nozzle 13 for producing the propulsive jet of combustion gases and air has a restricted throat 23 and is controlled by an axially movable throat member 108 carried by a central tube 109. The mechanisms for controlling the needle B and the throat member 108 are fully described in my co-pending application above referred to. The tube 109 extends forwardly to a shroud 69 arranged around the rear portion of the island C. The major intermediate section 12 of the shell A extending between the ram inlet 11 and the nozzle 13 is substantially cylindrical and forms the combustion chamber for the power plant.

The fuel supply system includes a pump 62 arranged within the stationary island C. The pump 62 is of the centrifugal type and its inlet or low pressure side is connected with an elbow 61. The elbow 61 in turn communicates with a fuel supply pipe 60 which extends outwardly through one of the hollow struts 47 to a suitable fuel supply not shown. The shaft 64 of the pump 62 is carried by spaced bearings 65 and an air turbine wheel 73 is fixed to the shaft. The above mentioned shroud 69 is spaced around the rear portion of the island C to leave an annular air passage 70. The passage 70 receives a portion of the rammed compressed air from the inlet 11 and the air stream flowing through the passage 70 acts upon blading 71 on the turbine wheel 73 to drive the turbine. The air turbine in turn drives the fuel pump 62. The high pressure side of the fuel pump 62 delivers the fuel under pressure to pipes 63 extending outwardly and rearwardly through the struts 47.

The vaporizing means of the fuel system is associated with the combustion chamber 12 to utilize the heat of combustion to vaporize the fuel before it is delivered to the injecting means. The lines 63 from the pump 62 lead through the struts 47 to an annular and tubular header 74 engaged within the shell section 12, see Figures 4 and 6. A similar header 75 is arranged rearwardly of the header 74 and the two header members are preferably substantially square in transverse cross section. A third manifold ring or header 76 of similar configuration is secured in the rear portion of the combustion chamber section 12 as shown in Figure 7. A series of circumferentially spaced vaporizing tubes 77 have their forward ends in communication with the fuel supply header 74 and pass rearwardly through openings in the walls of the adjacent header 75. The tubes 77 continue rearwardly in spaced adjacent relation to the wall of the combustion chamber section 12 and have their rear ends received in openings in the wall of the rear header 76. A similar set of vaporizing tubes 78 have their forward ends in communication with the fuel receiving header 75 and their rear ends are in communication with the rear header 76. The tubes 77 and 78 are preferably alternated in a single annular series as illustrated. Fuel supplied to the header 74 by the pump 62 flows rearwardly through the tubes 77 and then forwardly through the tubes 78 to the header 75. During this circuit the fuel is effectively vaporized. The tubes 77 and 78 and the manifolds 74, 75, and 76 are preferably formed of corrosion and heat resistant material such as "Inconel."

The fuel vaporized in the tubes 77 and 78 is delivered to vapor injection devices arranged in the forward portion or entrance of the combustion chamber. These devices are best illustrated in Figures 3, 4, 5 and 6. A plurality of circumferentially spaced tubular struts or bars 81 extend radially inward from the vapor header 75 and are spaced between the supporting struts 47. Partitions 82 in the rear portions of the struts 47 define vapor passages 83 therein. The inner wall of the tubular vapor header 75 has spaced ports 24 which communicate with the interiors of the bars 81 and passages 83 to deliver vapor thereto for inward flow to the injectors.

The injectors comprise what I will term cup strips 84 arranged on the bars 81 and struts 47. The cup strips 84 are preferably arranged in concentric radially spaced annular rows as shown in Figure 3, and although the strips may be provided in two or more spaced transverse planes, I have shown all of the strips in a single transverse or diametric plane. The cup strips 84 are curved or arcuate and are substantially U-shaped in transverse cross section, having curved forward end walls and spaced substantially parallel or concentric side walls which extend rearwardly relative to the direction of air flow. As shown in the drawings, the cup strips 84 are secured intermediate their ends to the struts 47 and bars 81 so that their side walls extend freely beyond the struts and bars, both in the rearward and circumferential directions.

Each circular row of cup strips 84 embodies a multiplicity of the strips related to have their ends in spaced adjacent relation whereby their interiors are, in effect, in communication but the individual strips are free for independent thermal expansion and contraction. The several circular rows of cup strips 84 are spaced and related as shown in Figure 3 so that the outer row is adjacent the wall of the shell A, and the inner row is in spaced surrounding relation to the above described shroud 69. The vaporizing strips are secured to the struts 47 and bars 81 by welding, or the like, so as to be rigid and stationary. Ports 85 are provided in the walls of the bars 81 and struts 47 to deliver fuel vapor to the interiors of the cup strips 84, and the inner ends of the bars and passages 83 are open to the innermost strips. This vapor travels or flows circumferentially in the cup strips and moves axially or downstream. In order to prevent stagnation of the vapor in the strips 84, and to assure a more complete and uniform combustion of the vapor by means of controlled primary combustion, I provide a series of spaced ports or openings 86 in or adjacent the forward walls of the strips. The capacity, location and spacing of these openings 86 are such that the flames are not extinguished by the air admitted by them into the interiors of the cup strips. It will be seen that the vapor injecting means provides and maintains an extensive and uniform dispersion of fuel across substantially the entire air stream at the entrance of the combustion chamber. The struts 47, bars 81 and cup strips 84 are preferably constructed of "Inconel," or the like.

Means are provided for igniting the fuel vapor at the injection system just described. As best shown in Figure 4, a glow plug 92 is threaded through a boss 87 on the shell A and passes inwardly through openings in the shell and header 75 to project into one of the hollow bars 81. The resistance wire of the glow plug for igniting the fuel is housed in a perforate shield 88. A liquid fuel line 89 enters the shell A and has a jet 90 directed to impinge a stream of fuel against the shield and glow plug. A short tap or pipe 91 leads from the interior of the liquid fuel header 74, and is arranged to direct a small stream of fuel against the shield and glow plug. A flame initiated at the glow plug travels out through the bar 81, and the openings 85, and progresses through the several cup strips 84 to ignite the fuel in the strips. In practice, fuel from the pipe 91 will usually be employed to start the engine. However, in the case of certain fuels of low inflammability, and under difficult starting conditions, additional fuel or special fuel may be supplied through the jet 90 to assist in starting.

The fuel vaporizing and injecting means serve to preserve a substantially constant air-fuel ratio irrespective of the altitude and translatory speed of the engine, the centrifugal pump 62 driven by the rammed air supply through the medium of the turbine 73 serving to maintain this ratio. The fuel pump 62 and turbine are designed and related to provide a given air-fuel ratio, for example, a ratio of approximately 18 to 1. During power plant operation, the liquid fuel is thoroughly vaporized during its passage through the tubes 77 and 78 and is efficiently burned upon admission to the high pressure and substantially constant pressure combustion chamber 12. The vaporization of the fuel increases the over-all efficiency of the power plant by a regenerative action and the evaporizing tubes carrying the fuel protect the walls of the combustion chamber section 12.

In considering the operation of the power plant, it may be assumed that the engine is to be associated with an air borne missile or aircraft to form a propulsive means therefor and that the missile or aircraft carries the fuel supply and the controls for the starting system, etc. The missile or aircraft is brought up to or beyond the speed of sound by other propulsive means, for example, by rocket power or turbo-jet propulsive devices. It is at this speed or above the speed of sound that the ram jet unit becomes efficient as a propulsive means. To start the engine current is supplied to the glow plug 92 and fuel is supplied to either the main fuel line 60 or the starting jet 90 or both. Air flow through the annular passage 70 operates the air turbine 73 which in turn drives the pump 62 to supply the fuel to the vaporizing means. The fuel flows through the tubes 77 and 78 to the struts 47 and bars 81 and a small stream of the fuel is discharged against the glow plug 92 by the jet 90 or pipe 91. The fuel is ignited at the glow plug 92 and as described the flame progresses through the adjacent bar 81 to the several annular series of cup strips 84 to provide flame at the several cup strips. The fuel employed may be gasoline, coal oil or other appropriate liquid fuel. After flame propagation is initiated at the cup strips 84, the fuel vapor continues to travel or flow circumferentially in the cup strips and moves axially or downstream from the strips. The spaced openings 86 admit sufficient air to the strips 84 to prevent stagnation of the fuel vapor and to obtain a complete uniform combustion of the vapor. However, the capacity and arrangement of the openings 86 are such that the flames are not extinguished by the air admitted through them. The fuel vapor burner embodying the annular series of cup strips 84 provides and maintains a substantially uniform dispersion of the fuel vapor across substantially the entire air stream of the power plant. The effective distribution of the fuel at the entrance portion of the combustion chamber 12 assures efficient operation of the power plant. The several cup strips 84 mounted as described above have individual freedom of thermal expansion and construction both in the circumferential direction and the radial direction. This is important in preventing distortion of the burner parts.

Having described only a typical preferred form of my invention, I do not wish to be limited to the particular details set forth, but wish to reserve to myself any features or modifications that may fall within the scope of the following claims.

I claim:

1. In a reactive propulsion engine, a combustion chamber, means for supplying air under pressure to the entrance of the combustion chamber, a propulsive nozzle at the exit of the combustion chamber, fuel supply means, and vaporizing and injecting means receiving fuel from the supply means and injecting fuel vapor into the combustion chamber, the last named means including circumferentially spaced tubular members extending radially into the entrance portion of the combustion chamber and conducting fuel from the supply means, and sets of arcuately curved radially spaced cup strips secured intermediate their ends to the members to receive fuel therefrom, the cup strips having spaced generally concentric imperforate side walls, perforate upstream walls and having open sides facing downstream.

2. In a reactive propulsion engine, a combustion chamber, means for supplying air under pressure to the entrance of the combustion chamber, a propulsive nozzle at the exit of the combustion chamber, fuel supply means, and vaporizing and injecting means receiving fuel from the supply means injecting fuel vapor into the combustion chamber, the last named means including circumferentially spaced tubular members extending substantially radially inward in the entrance of the combustion chamber and conducting fuel from the supply means, and radially spaced arcuate cup strips secured intermediate their ends to the members and arranged to form radially spaced circular series of the strips, said cup strips having communication with their respective tubular members to receive fuel therefrom and having their open sides facing downstream, the cup strips having spaced concentric imperforate side walls and upstream wall portions joining the side walls, the upstream wall portions of the cup strips having circumferentially spaced air admitting openings.

3. In a reactive propulsion engine, a combustion chamber, means for supplying air under pressure to the entrance of the combustion chamber, a propulsive nozzle at the exit of the combustion chamber, fuel supply means, vaporizing means receiving fuel from the supply means, fuel injecting means including tubular members receiving the vapor from the vaporizing means and extending into the combustion chamber, channel strips secured intermediate their ends to the members to have their ends free and to have their interiors in communication with the members, the free ends of the strips on adjacent members being in spaced adjacent and aligned relation so that the interiors of the strips are in communication, and means associated with one of the tubular members for igniting the fuel vapor in the several strips.

4. In a reactive propulsion engine, a combustion chamber, means for supplying air under pressure to the entrance of the combustion chamber, a propulsive nozzle at the exit of the combustion chamber, fuel supply means, vaporizing means receiving fuel from the supply means, fuel injecting means including tubular members receiving the vapor from the vaporizing means and extending into the combustion chamber, channel strips on the members having their interiors in communication with the members to receive the fuel vapor therefrom, the interiors of the strips on the several members being in communication one with the other, an igniter at one of the tubular members for igniting fuel therein, and means for supplying fuel to the igniter to initiate combustion of said vapor in the several channel strips.

5. In a reactive propulsion engine, a combustion chamber, means for supplying air under pressure to the entrance of the combustion chamber, a propulsive nozzle at the exit of the combustion chamber, fuel supply means, vaporizing means receiving fuel from the supply means, fuel injecting means including tubular members receiving the vapor from the vaporizing means and extending into the combustion chamber, channel strips on the members having their interiors in communication with the members to receive the fuel vapor therefrom, the interiors of the strips on the several members being in communication, a glow plug in one of the tubular members, and means for jetting fuel from the supply means to the glow plug to initiate combustion of said vapor in the channel strips.

6. In a reactive propulsion engine, a combustion chamber, means for supplying air under pressure to the entrance of the combustion chamber, a propulsive nozzle at the exit of the combustion chamber, fuel supply means, vaporizing means receiving fuel from the supply means, fuel injecting means including tubular members receiving the vapor from the vaporizing means and extending into the combustion chamber, U shaped channel strips on the members having their interiors in communication with the members, the strips having generally parallel side walls and end walls facing toward the entrance of the combustion chamber, said side walls being imperforate and said end walls having air admitting openings, the interiors of the strips on the several members being in communication, a glow plug in one of the tubular members, and a jet for discharging starting fuel at the glow plug to initiate combustion of the vapor at the channel strips.

7. A reactive propulsion engine comprising a tubular air receiving and conducting shell, a portion of the shell constituting a combustion chamber, a plurality of circumferentially spaced fuel conducting members extending substantially radially into the chamber, and radially spaced cup strips secured to said members to be in fuel-receiving communication therewith, the cup strips having imperforate generally parallel side walls and being arranged with their open sides facing downstream with relation to the combustion chamber, there being spaced air-admitting openings in the upstream walls of the strips.

NATHAN C. PRICE.

References Cited in the file of this patent

UNITED STATES PATENTS

| Number | Name | Date |
|---|---|---|
| 1,405,482 | Bostedo | Feb. 7, 1922 |
| 1,601,863 | Leins | Oct. 5, 1926 |
| 1,725,914 | Hallowell | Aug. 27, 1929 |
| 2,114,738 | Heller et al. | Apr. 19, 1938 |
| 2,326,072 | Seippel | Aug. 3, 1943 |
| 2,385,833 | Nahigyan | Oct. 2, 1945 |
| 2,417,445 | Pinkel | Mar. 18, 1947 |
| 2,438,247 | Knudsen | Mar. 23, 1948 |
| 2,479,776 | Price | Aug. 23, 1949 |
| 2,502,332 | McCollum | Mar. 28, 1950 |
| 2,503,006 | Stalker | Apr. 4, 1950 |

OTHER REFERENCES

"Gas Turbines and Jet Propulsion," by G. Geoffrey Smith, 1944 (Fig. 23).